| PUNCHED IN CARDS | ENTERED TEMPORARILY IN CORE MEMORY | | | | | | | | | | FINAL VALUE IN CORE MEMORY |
|---|---|---|---|---|---|---|---|---|---|---|---|
| | INDEX LINE | | | | | | | | | | |
| | 0 | 1 | 2 | 3 | 4 | 5 | 6 | 7 | 8 | 9 | |
| BLANK OR 0 | [9] | 8 | 7 | 6 | 5 | 4 | 3 | 2 | 1 | 0 | 0 |
| 1 | [9] | [9] | 8 | 7 | 6 | 5 | 4 | 3 | 2 | 1 | 1 |
| 8 | [9] | 8 | 7 | 6 | 5 | 4 | 3 | 2 | [9] | 8 | 8 |
| 4 & 8 | [9] | 8 | 7 | 6 | [9] | 8 | 7 | 6 | [9] | 8 | 8 |
| 9 | [9] | 8 | 7 | 6 | 5 | 4 | 3 | 2 | 1 | [9] | 9 |

([9] = 9 FORCED INTO MEMORY)

INVENTOR
RUSSELL H. LARSON

BY J W Armbruster

ATTORNEY

April 2, 1963 R. H. LARSON 3,083,903

DATA TRANSLATING SYSTEM

Filed Oct. 9, 1958 6 Sheets-Sheet 2

April 2, 1963 R. H. LARSON 3,083,903

DATA TRANSLATING SYSTEM

Filed Oct. 9, 1958 6 Sheets-Sheet 3

DATA TRANSLATING SYSTEM

Filed Oct. 9, 1958

6 Sheets-Sheet 5

United States Patent Office 3,083,903

Patented Apr. 2, 1963

3,083,903
DATA TRANSLATING SYSTEM

Russell H. Larson, Wappingers Falls, N.Y., assignor to International Business Machines Corporation, New York, N.Y., a corporation of New York

Filed Oct. 9, 1958, Ser. No. 766,269
7 Claims. (Cl. 235—61.6)

This invention relates to card controlled electronic input devices and more particularly to means for sensing decimally coded card indicia in parallel and exercising serial word entry control thereby over magnetic core storage or memory devices wherein the cores are arranged and controlled for binary coded decimal notation.

The prior art contains a number of showings where card control input devices control core memory devices. As an example of one such device, reference may be made to the Rabenda Patent 2,774,429 wherein mechanical cam contacts control the conversion of decimal card notation to binary core storage. A somewhat more complicated style of operation is set forth in U.S. patent application Serial No. 704,779, filed on December 23, 1957, for E. Estrems and M. Papo entitled "Device for Transferring Data Read From Record Cards." In this last mentioned application, the card perforations are read in parallel and stored in an intermediate core storage device. Upon the passage of every one of the 12 rows of card indicia under sensing devices, the data stored in the intermediate core storage is read out serially and directed into a coder for changing the decimal values as represented by card timing into binary notation as represented by the on or off status of four stage binary trigger devices in the coder. From the coder the binary values are transmitted to a main core memory device which is composed of matrices of magnetic cores arranged in binary formation. Upon the passage of each card row under the sensing brushes, the sensed data is merged with the previously stored data from the main memory and regenerated in the coder in the new form and recirculated to be put back in the main core memory. In other words, upon the sensing of every row of card decimal information and the storing thereof in the intermediate memory, there is directly thereafter the combining of this with the previously stored data in the main memory and these two sources of code information are brought together in the coder where the binary information is reconstituted before being directed back in a recirculating or regenerating manner to the main core memory.

The devices of the present invention differ from the foregoing by the style or manner in which the coder (or storage register in the present case) is actuated to convert the card decimal notation into binary coded decimal notation for the core memory device. The style of operation comprises the entry of nine impulses into the storage register as an accompaniment to the passage of each card row of perforations or digital indicia. This style of operation also involves the entry of "9" upon the sensing of a perforation in the card and the addition of 9 impulses for the passage of every following row of index points on the card down to the "9" position which is the last row on the card since the card is assumed to be sensed with the 12 row first in the present application. Taking the example of the sensing of a "6" card perforation, there is the entry of "9" therewith, followed by the addition of 9, 9, and 9 for the successive card rows of 7, 8 and 9 index points. This results in a total of 36 (there is no carry, hence the 3 is non-existent) or a "6" standing in the storage register which is the true reading of the card perforation. The general formula for all digits is $(10-X)9=X$ with carries disregarded.

In order to take care of zero representations or blank card columns, all core memory orders receive a forced "9" at "0" card time, and 9 impulses for each of the other nine card rows thereafter to result in a correct register standing of "0" should there be no intervening card perforation. When there is a card perforation for a digit 1–9, the sensing of it forces a "9" and wipes out any previous accumulation which would have gone towards forming a "0" and instead the proper digit is formed.

It will be noted from the foregoing that the present novel devices operate without the use of mechanical or electro-mechanical cam contacts for binary coding since the purely electronic impulsing and commutating controls provide faster and more compatible devices which are also suited for operation with electronic calculations effected in cooperation with the input to core storage. The serial driving and scanning devices used in cooperation with the card to storage input are also usable in connection with the transfer of information in and out of the memory devices and into the calculating portions of the machine for operations such as multiplying and dividing.

An object of the invention is the provision of devices for setting a binary register by the successive entry of "9" for a number of times related to the digit which is to be entered. The relationship is such that with X a digit may be represented by the formula $(10-X)9=X$ (tens disregarded). In effect the register is stepped down by one digit on each entry control cycle; the control being effected by the successive entry of 9.

Another object of the invention is the provision of means for controlling binary storage of digits in a memory device by means of generation of a selected digit by the selective entry of a differential number of 9 pulses per entry. Memory data is recirculated or regenerated through a storage register for each cycle to arrive at a digit to be stored by means of electronic addition. Units and tens word read lines read the cores and operate through sense amplifiers to control the storage register. This involves the regeneration or recirculating of successively diminishing decimal digits through the successive addition of nine in a storage register to previously entered "9's" represented in the memory device, whereupon merging of such successive numbers causes a "counting down" operation and a resulting binary digit representation in the register which is regenerated back into the memory device for a differential number of times as determined, in the present case, by the appearance of the last or "9" index point row on a card. Units and tens word write lines switch the cores as controlled by the storage register binary stages.

Another object of the invention is the provision of means controlled by a perforated decimal notation record card, for generating from said perforations, a representation in a magnetic core binary memory device as controlled by the successive entry of the value 9 generated for a differential number of times as determined by the location of the digit represented indicium or perforation in the record card.

Another object of the invention is the provision of data input devices for data insertion into electronic storage and calculating devices, representations of data generated by the successive operation of a common number of impulses, generated differentially according to the magnitude of the data it is desired to have entered.

Another object of the invention is the provision of means for entering in parallel, a plurality of data representations which are sequentially scanned serially as to word grouping and in parallel as to separate digits, said words being generated by commom impulse and scanning means operating in a uniform style of entry involving the entry of one nine or repetitive entries of the value nine.

Other objects of the invention will be pointed out in the following description and claims and illustrated in the accompanying drawings, which disclose, by way of example, the principle of the invention and the best mode, which has been contemplated, of applying that principle.

In the drawings:

FIG. 1 is a block diagram of the information flow circuitry showing diagrammatically how a card is read with the "12" edge first, and the memory device controlled by associated electronic impulsing regenerating and scanning selectors in a circulating loop including a storage register.

FIG. 2 is a chart showing the scheme of operation involving the forcing of the value 9 into memory at "0" card time invariably, followed by the differential entry of 9 in a storage register upon the appearance of a card perforation and the invariable entry of 9 thereafter to effect a "counting down" operation in the storage register for circulation to the core memory device which has in it finally a binary setting representing the card perforation.

FIGS. 3*a* and 3*b* when placed with the first above the second, provide a more detailed diagram of the information flow circuitry for entering into binary core memory devices the data coded on a card in decimal perforations as noted more generally in FIG. 1.

FIG. 4 is a detail view showing a sample magnetic core with a set of driver lines and windings; there being two "read" lines, two "write" lines, an "inhibit" line and a "sense" winding.

FIGS. 5*a* and 5*b* when placed with 5*a* at the left of 5*b*, together form a diagram of the timing control circuitry which reveals mainly the scanner control ring of five stages for general cycle control and the units and tens scanner rings for serial word memory device operation.

The invention is illustrated in connection with a card controlled calculator of the general type set forth in the Palmer et al. Patent 2,658,681 wherein multiplier and multiplicand data are derived from a record card, calculations are performed in accordance with a predetermined sequence of operations and the results are punched back into the same record card.

Figures 1, 2:
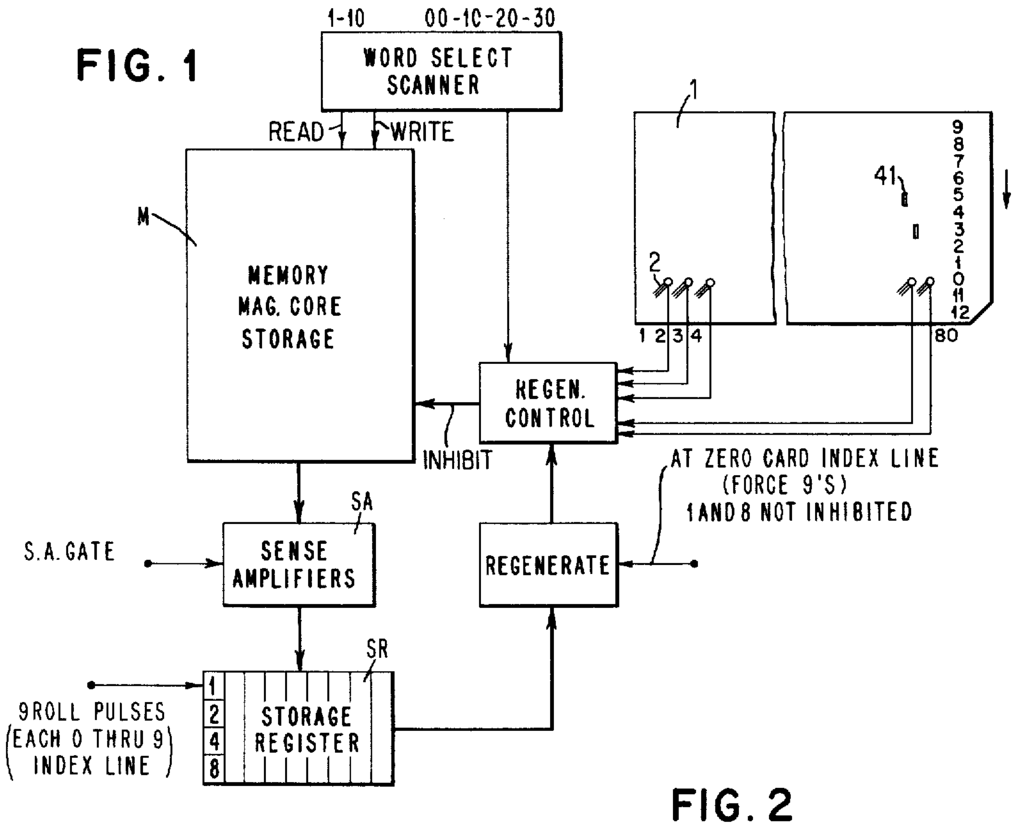

(It should be noted at the outset to avoid confusion, that FIG. 1 shows the information flow circuitry and only a portion of the timing control circuitry.)

Card 1 is of the regular 80 column (or denomination) variety (FIG. 1) having 12 rows of possible punched positions. The card index points or rows are considered in this case with the "12" row leading, and following thereafter the 11, 0, and 1–9 rows. Since alphabetic data is not under consideration, the 0–9 rows (card index points) are the ones of main consideration. The numbers which are derived from the card are serially distributed into memory M in 30 possible groups, hereinafter referred to as words, from a high speed parallel card reader. This is the maximum number of words which can be accommodated in this particular machine at one card index point. Each word has a variable length of up to 9 denominations (decimal digits). As the words are serially read in, all denominations of each word are read in in parallel. Of course, if all of the words were 9 decimal digits long, in an 80 column card, there would only be room for eight-9 decimal digit words (with 8 unused digits remaining). In actual practice, however, the word lengths may vary, so that by utilizing the plugboard (not shown in FIG. 1) of the card reader, up to 30 words per card can be read in.

The binary magnetic core memory device M is connected in a gated loop with a four stage binary storage register SR. Each decimal digit of each word is stored in memory M in a four bit binary coded decimal (BCD) form. The basic element of storage register SR is a four stage binary counter which utilizes bistable triggers. In order to accommodate the situation where a word being read in consists of the maximum number of decimal digits (nine), 9 SR counters arranged in parallel are provided.

At "X" card time, that is, when the read brushes 2 sense for perforations at the 11 card index line, all of the elements in this invention are reset. At "0" card time a value of 9 is forced into the magnetic core memory elements for each denomination of word being read in. This is accomplished in the following manner. The Word Select Scanner first generates Read pulses which read out of memory M all of the BCD numbers which correspond in position to the number being read from the card. Because the memory was previously reset at "X" index line, nothing (with the possible exception of the sign core) is read out into the Storage Register and all 9 counters remain in their reset position. At this point, 9 "roll" pulses are applied to each Storage Register counter, resulting in a count of 9 (1 and 8 triggers "up," 2 and 4 triggers "down"). A 9 count is transferred to the memory M by blocking the 2 and 4 channel outputs of the Storage Register by an input to the Regenerate circuitry. After the 9 roll pulses have been entered into the SR, the Word Select Scanner generates Write pulses to all bit positions of the particular word being dealt with. Simultaneously, inhibit pulses are generated which (if not controlled) act to neutralize the aforementioned Write pulses. The input of these inhibit pulses to memory M is controlled in the Regenerate Control circuitry by the output of the SR. On any line where the SR produces an output, the inhibit pulses are blocked and do not enter memory M. On any line where the output of the SR is blocked (by the Regenerate circuitry), the inhibit pulses pass through to memory M and neutralize the Write pulses. Thus, at the "0" index time, channels 2 and 4 from the Regenerate circuitry block their respective lines from SR which lead into memory M, and allow the inhibit pulses to neutralize the 2 and 4 in every binary coded decimal digit of the particular word being read. Likewise the Regenerate circuitry blocks the inhibit of the 1 and 8. This is the initial forcing of "9's." This cycle is repeated 30 times, once for each of the words being read-in.

Upon the passage of the next card index point, the 9's just previously entered are read out of the memory M (by the read pulse generated in the Word Select Scanner) and entered into the Storage Register SR.

Storage Register SR is then pulsed with 9 pulses which, added to the "9" which presently exists in the SR, result in the value of 8. Should there be no perforation in the card column corresponding to this denomination at the row being sensed, the 8 is regenerated or written back into the memory by inhibiting all memory lines other than the "8" line. Should there be no perforation in a particular card column, then there are ten such additions of 9 or a total of 90 which results in the correct lowest order zero (the 9 of the 90 may be disregarded because for present purposes the Storage Register SR does not operate to effect carrying between denominations).

Assume now, that there is a card perforation 41 at the 5 index line which is sensed when said line is beneath the read brushes 2. At this point, read out from the memory will occur and a "6" will be entered into the Storage Register SR ("6" being the amount left in the memory by the counting down sequence of the previous card index line). The 9 pulses will again be rolled into the Storage Register SR with the resulting total of 5 being generated (1 and 4 up, 2 and 8 down). However, card perforation 41 will cause blockage of the 2 and 4 channels and generation of up levels on the 1 and 8 channels in the Regenerate and Regenerate Control circuitry. These levels override the output of the Storage Register SR and cause a 9 to be "forced" into memory M instead of the "5." Thus, when any card hole is sensed, a 9 is forced into memory, cyclically recirculated through the Storage Register SR and other nines are added to it in a uniform pulsing fashion for the passage of each index point row on the card. In the case of the "5" card perforation, there remain the 6, 7, 8 and 9 card rows to be passed sequentially, and 9+9+9+9 to be added to the 9 which was entered in the register SR at "5" time, yielding a total of 45 or the correct 5 which is stored in core memory M when the bottom or lowest "9" card row is reached. Since the card entry index point rows are sensed in ascending order 0, 1, 2, 3, etc., it is evident that for generating any digit, it is the tens complement of the digit which is multiplied by 9 to yield the corresponding added register digit to be written in core memory M. The invariable entry of 9 acts as a counting down expedient as though one were subtracted on each index point of card row sensing. The selective starting of the 9's entries at either zero or under control of the card creates an improved style of operation for card read in control.

FIG. 2 is a graphical representation of the operation of this invention. In reading FIG. 2, assume that the card being read passes from right to left under the card reader and the values of 0, 1, 8, 4 and 8, and 9 are respectively punched in five columns shown. At "0" time or when the brushes are over the 0 index line, a 9 is forced into memory M for each column being read. As index line 1 passes beneath the brushes, 9's are automatically added (in the storage register) to the 9's which were previously inserted at the "0" index line, with the result that "8's" replace the 9's in memory. In the second column, however, there is a punch in the 1 position, therefore, although a 9 is added to the 9 read out from memory M in the storage register SR, a new 9 is forced (regenerated) into the memory and the read cycle continues. The operation of the reader as remaining card index lines pass beneath the brushes is identical to that just explained. Since any card perforation sensed, serves to force a 9 regardless of the setting of the memory elements, it is evident that in the case of the two card perforations per column (fourth column) it is always the last sensed or highest valued which prevails, since it is at that point that the counting down restarts.

As aforestated, the information derived at any card index point is separable into a maximum number of thirty separate words, no individual word having more than 9 decimal digits. Therefore, in the case where all thirty words are being read in and utilized, provisions are made for the cyclic input of these words, in parallel by denomination or decimal digit. These cycles are shown diagrammatically in FIG. 7. The first, or reset cycle, is used to actuate all reset mechanisms in the timing control circuitry. The following thirty cycles are all repetitions of one another—that is, they are individual word read in cycles which occur during the passage of a single card index point beneath the read brushes.

The basic timing control of the read in cycles is derived from "A" pulses, generated by a 100 kc. oscillator (not shown in the drawings) and contained in the calculator of which the subject invention forms a part. The "B" pulses which will be hereinafter referred to in the discussion of the timing control circuitry, are merely "A" pulses phase shifted by 180 degrees. Note in the timing chart that the "B" pulses provide an input to the MQD unit—a four stage binary counter, whose count controls the read in to the storage register SR of the 9 roll pulses.

Figures 6, 7:
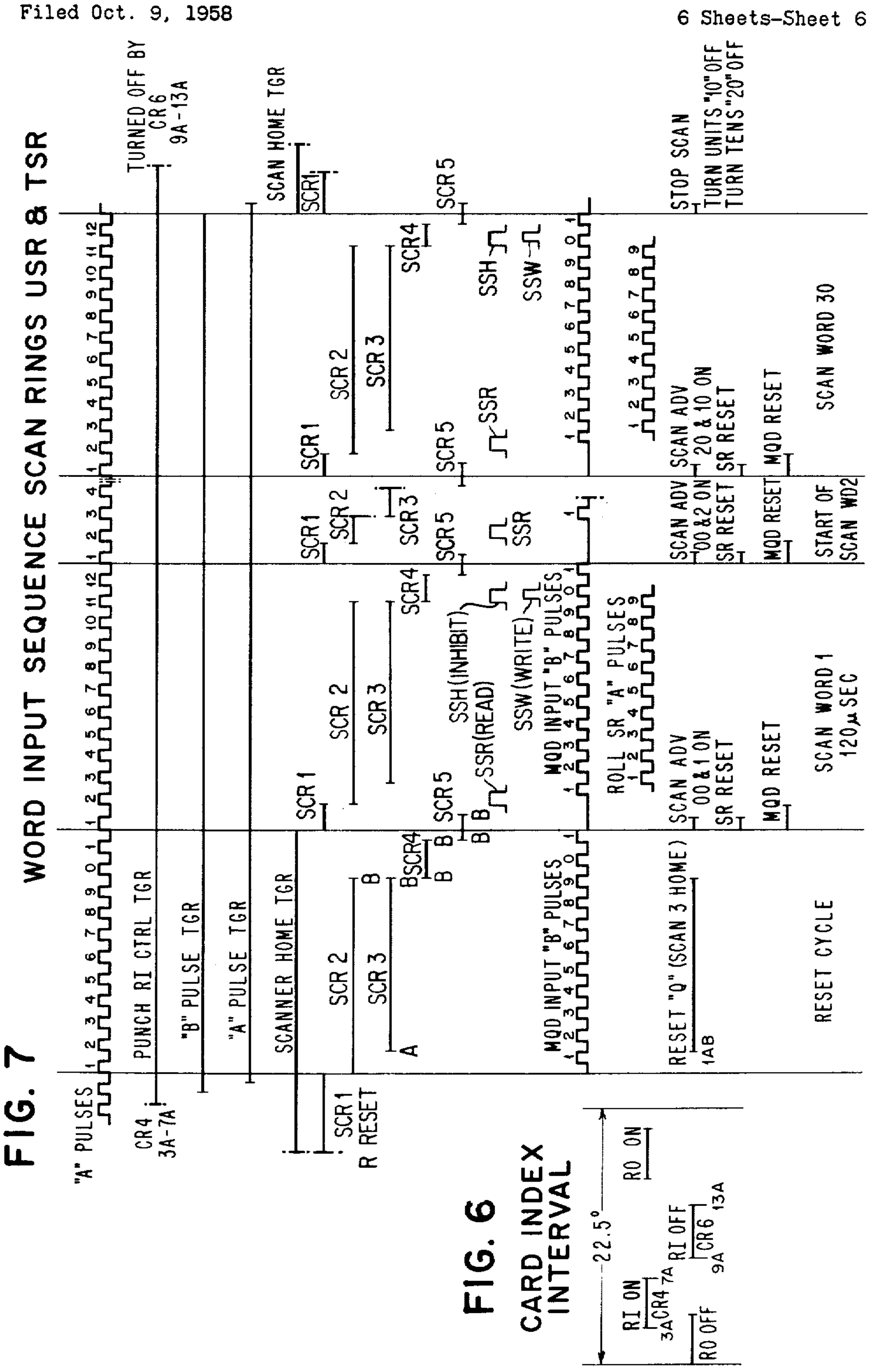
FIG. 6 is a detail view of a timing diagram of readin and readout control intervals within a card index interval.
FIG. 7 is a timing chart showing the electronic scanner control for serial word entry into memory and associated timing of the ten possible entries of "9" for generating a digit to be stored.

The timing control of the information flow circuitry is accomplished by a set of five triggers which are generally designated the Scanner Control Ring and more specifically SCR1 through SCR5. Their circuitry is shown in detail in FIG. 5*a* and will be discussed in the section of this specification concerned with the detailed operation. For the present, only the output of SCR2, as shown in FIG. 7, is of concern. The initiation of SCR2's output causes a single shot oscillator to generate a read pulse SSR to the memory. When SCR2 is turned off, the negative shift causes another single shot oscillator to generate an inhibit pulse SSH and a short delay thereafter a write pulse SSW. These three pulses SSR, SSW, and SSH controlled by SCR2, and the manner in which they are utilized in the information flow circuitry of FIGS. 3*a* and 3*b* form the crux of the subject invention.

Before entering an explanation of the operation of the specific circuitry, it is well to remember that this device is incorporated in a card controlled calculator and as such is affected by certain signals which emanate from said calculator. These will generally be of two types, the first being a voltage level which is selectively applied to various inputs of the information flow and timing control circuitry in accordance with the particular card cycle in operation at the time, e.g., a level designated CF17 is applied only during 0 card index point read in. The second inputs from the calculator are the on-off control pulses for the card reader and are designated as CR4 and CR6.

In order to realize the speed of operation of the electronic read in control for thirty words, it is revealing to note in FIG. 6, the time of passage of only one card index line and how the complete "read in" operation "RI on" occupies only a fraction of that fast mechanical movement.

Figures 3A, 4:
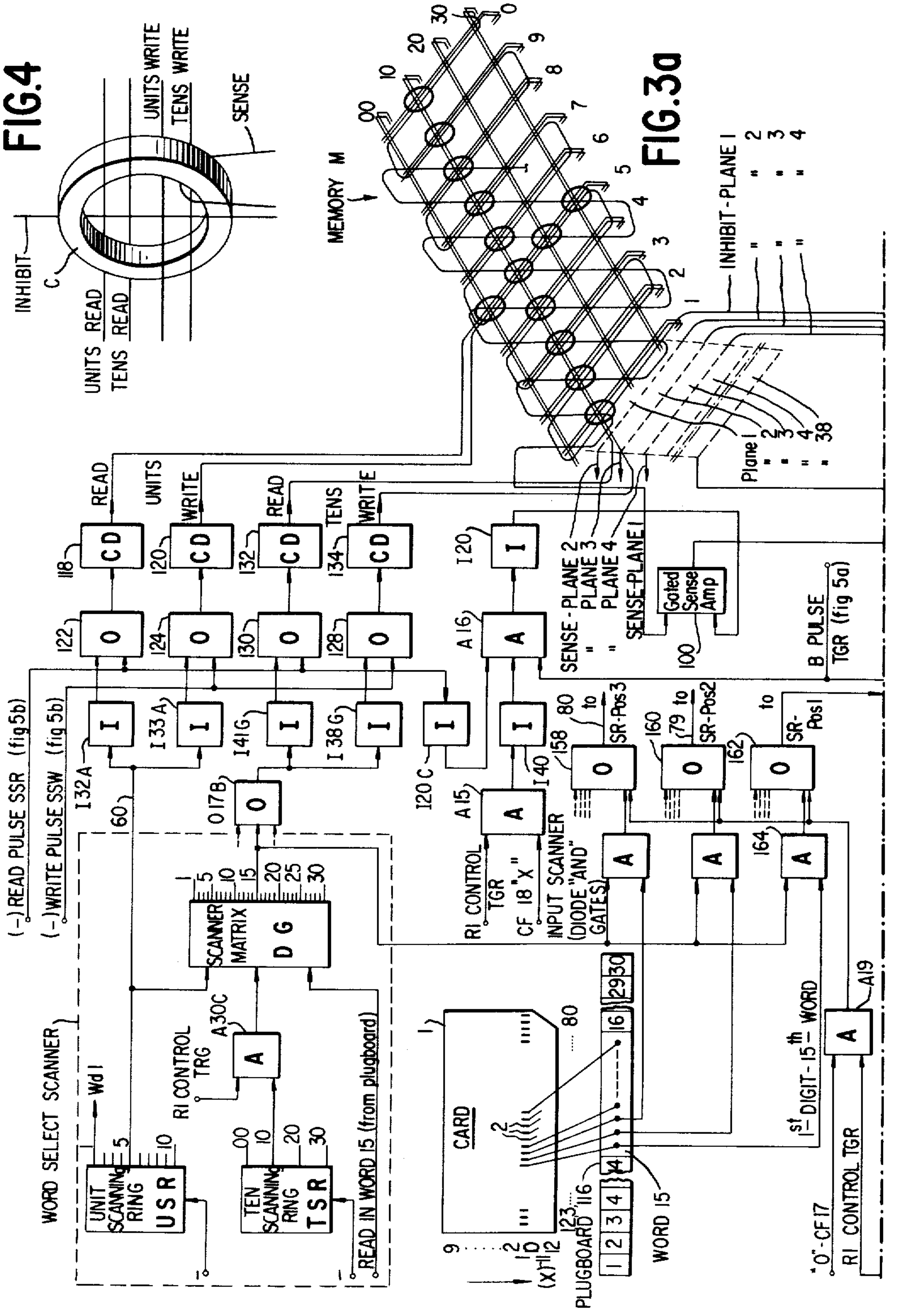

In FIG. 4 an example is shown of the windings or lines in association with a single magnetic core memory element C, which is utilized in memory M. Six windings are shown, two read windings, two write windings, a sense winding, and an inhibit winding. A general discussion of core memory operation is set forth in Patents 2,708,267 and 2,739,300 and other patents of the same class. Briefly, the memory of which the core of FIG. 4 forms an individual element is of the coincident-current variety and is shown schematically in FIG. 3*a*. A single plane of the matrix consists of a three row by ten column array of cores. There are 38 core planes, 36 of which accommodate the nine-4 bit BCD numbers or denominations and two for accommodating signs. Each plane is provided with a plurality of row windings, each inductively coupling a row of cores; and separate column windings, each inductively coupling a column of cores. The corresponding row windings and the corresponding column windings in all memory planes are respectively connected serially so that a selected row and column intersect a group of cores occupying corresponding positions. Simultaneous excitation in all planes of a selected row winding and a selected column winding with a half-write current, causes the cores at the intersections of these windings to have their magnetic condition changed. Each plane is provided with a sense winding inductively coupled to all of the cores in the plane to sense the change in the magnetic condition of the selected core in the plane. Individual cores can be prevented from changing their magnetic state if an impulse is passed through the core in a direction opposite to the direction of one of the other two half-write impulses. This blocking action is called "inhibit" and is caused by a separate winding which couples every core in a single plane in an opposite sense to one of the half-write windings.

The complete read-in operation of the data translator can be divided into three intervals. The first interval occurs as card row 11 passes beneath the read brushes. It is during this interval that all the resetting functions are accomplished within the data translator (including the dumping of memory and the resetting of the timing control and data flow circuitry). This reset cycle, at the 11 or X card index line, should not be confused with the reset cycle which occurs at each card index line before read in is accomplished. The latter reset cycle is utilized just to reset the timing control circuitry and occurs at the beginning of each read in cycle, including the cycle at 11 or X card index line. The next interval (0 time) occurs when the 0 index line is beneath the read brushes.

It is at this time that the first series of 9 pulses are pulsed into the storage register and forced into the core memory. The third period entails the complete read in of the remaining index lines 1–9. The electronic circuit operations during these periods will be discussed at X (or 11) time, zero time, and once for the remaining index lines (1–9).

READ IN OPERATION AT CARD INDEX LINE X

*General Explanation*

All words plug wired to read-in are reset at this line. The words are reset as they are scanned one through 30. The scanning operation is controlled by the 5 stage closed ring (scanner control ring) SCR1–5 (FIG. 5*a*) which is advanced with A pulses. The scanner control ring (SCR) makes 31 cycles by not gating the sense amplifiers to complete a scanning sequence. The first cycle is necessary to reset various circuits required for the scanning operation. During the following 30 cycles each cycle sequentially reads out one word of storage. At the X index line, the core memory information is prevented from entering the storage register SR (FIG. 3*b*) and is lost. This effectively resets the storage word. The storage register amount of zero is then written into the memory cores (9 roll pulses are not entered into the SR at X card index line). At the time cores are written into (regenerated) an X perforation wired at the plugboard and read from the card, causes the respective sign trigger of the storage register to enter this information into memory M. The sign is entered when the respectively wired storage word is written into (regenerated).

Each cycle of the scanner control ring SCR (FIG. 5*a*) advances the units scanner ring USR (FIG. 5*b*) one of ten stages. Each time the units scanner USR is advanced past 10 back to one, the tens scanner ring TSR (FIG. 5*b*) is advanced through 00 or 10, 20, 30. Later in each SCR cycle, read and write pulses are gated with the outputs from the units and tens scanner rings. The gated pulses develop core driving pulses. The coincidence of the units and tens scanner ring outputs thus establish the exact core memory word that is to be operated.

At the completion of the 31st SCR cycle, the units scanner ring "10" trigger T10 is turned off, which turns off the tens scanner ring "20" trigger T20. The output from the "20" trigger T20 stops further advancing of the scanner control ring. This operation ends the read-in operation for the X line of index.

*Specific Explanation*

The more specific objectives of the read-in start may be listed here and explained further:

(1) Start the read-in operation at the X index line and provide pulses to drive the scanner control ring (SCR).

(2) Advance the scanner control ring one cycle.

(3) Advance the scanner ring triggers.

(4) Read out word one from cores and regenerate.

(5) Stop the scanner control ring (SCR).

START READ-IN OPERATION AT X INDEX LINE (RESET CYCLES, FIG. 7)

Figure 5A:
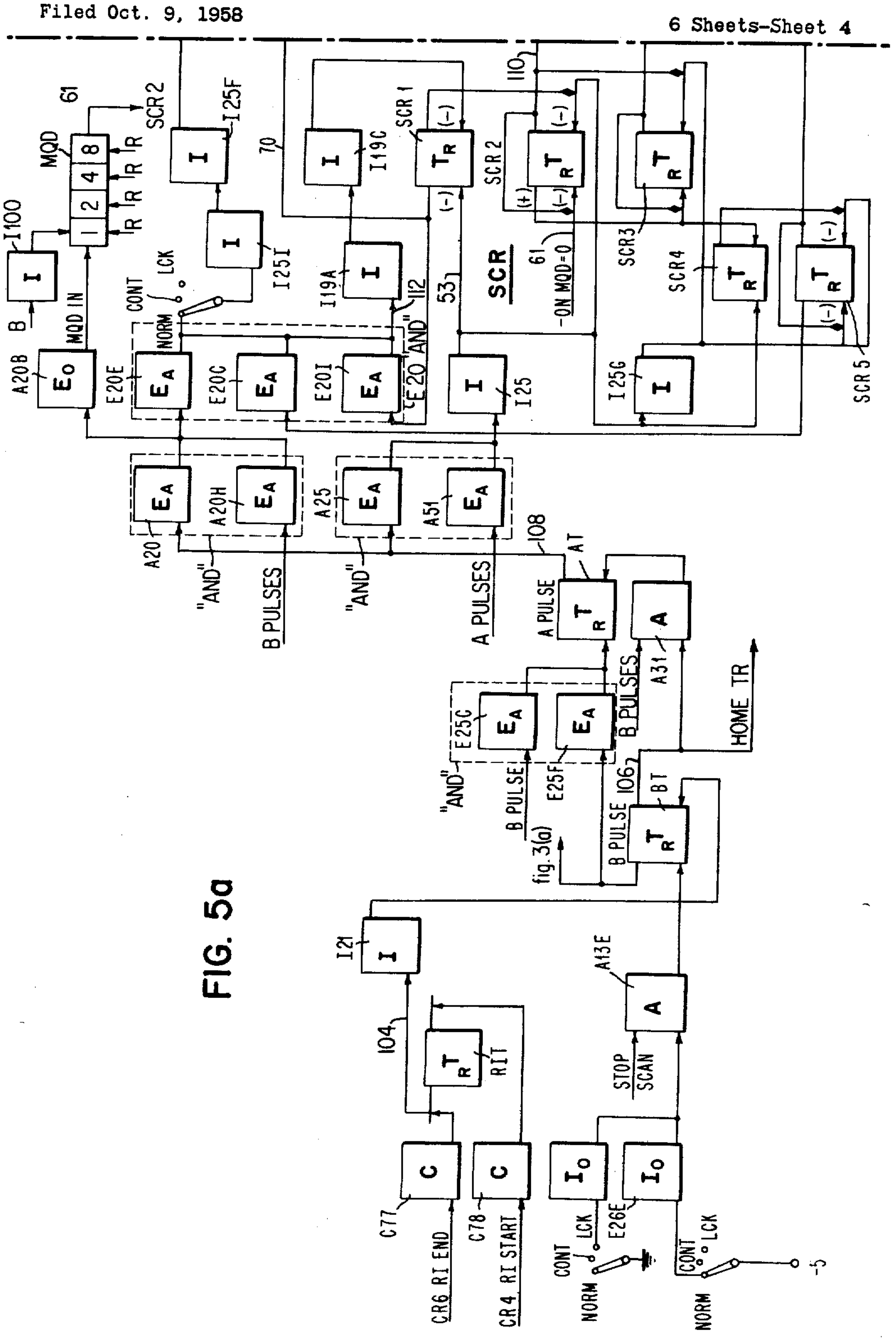

A. Turn on the read-in control trigger RIT (FIG. 5*a*).

(1) A read-in start impulse is provided by CR4.

(2) The CR4 read-in start impulse (FIG. 5*a*) is converted to a 5 volt shift at the clamp (C78) which then turns on the read-in control trigger RIT.

B. Turn on the B pulse and then the A pulse control triggers.

(1) The negative off side shift from the read-in control trigger RIT (at 104) is inverted in I21 to a plus shift and turns on the B pulse control trigger BT.

(2) The B pulse control trigger BT plus on side output 106 ANDS A31 with the next B pulse to turn on the A pulse control trigger AT.

C. Provide pulses to drive the scanner control ring.

(1) The A pulse control trigger AT plus on side output 108 ANDS A25 with the following A pulses at A51 and feeds the ANDED A pulses through an inverter I25 to drive the SCR through line 53.

(2) The A pulse control trigger AT plus on side output 108 ANDS A20 with the following B pulses A20H to drive the scanner control ring (through 3-way AND E20E, E20C, and E20I) and the MQD through A20B. The MQD, FIG. 5*a*, is a four stage binary coded decimal counter which is pulsed by B pulses to provide ten slightly delayed A pulses. The MQD is not needed until the zero index line and is mentioned there.

ADVANCEMENT OF THE SCANNER CONTROL RING (SCR)

A. The SCR is reset so that SCR1 trigger is on and the other four SCR triggers are off.

(1) Two reset pulses, R and Q, are simultaneously developed before read-in starts. Reset R is utilized to reset the SCR triggers, whereas reset Q is used to restore all word scanner ring triggers, that is, the units scanning ring USR and tens scanning ring TSR. R and Q reset generating circuitry is not shown, but the reset inputs to the various triggers are denoted in FIGS. 5*a* and 5*b* by small R's and Q's in the trigger blocks. A second Q reset is also generated at a later time under the control of scan control ring trigger 3 and will be discussed hereinafter.

B. Advance the SCR; turn off SCR1 and turn on SCR2

(1) The 1st A pulse after the A pulse control trigger AT is turned on, turns on SCR2 and turns off SCR1.

(2) On the first SCR cycle, the plus on side output 110 from SCR2 is blocked by AND A21, A23, because the scanner ring home trigger HT (FIG. 5*b*) is on. Thus, no read, write or inhibit pulses are generated during the reset portion of the X card index line cycle. The input to AND A23 is negative only on the first SCR cycle.

C. Turn on SCR3 with the second A pulse through inverter I25G (FIG. 5*a*). At this point both SCR 2 and 3 are on.

(1) The plus on side output of SCR3 ANDS A31E (FIG. 5*b*) with scanner ring home trigger HT to develop reset "Q" through inverter I7.

D. Turn off SCR2 and 3, turn on SCR4.

(1) A delay occurs before SCR2 and 3 are turned off. SCR2 is turned off by a negative output from the MQD (FIG. 5*a*). The MQD is the four stage counter that is advanced by the output of A20B with B pulses which were previously ANDed with the output of the A pulse control trigger in A20, A20H. When the MQD counter is advanced from 9 to zero, a negative output is fed through 61 to turn off SCR2. During the delay interval, eight, A pulses (3 through 10) could not advance the SCR.

(2) The plus off side output from SCR2 turns off SCR3 and turns on SCR4.

E. Turn off SCR4 and turn on SCR5.

(1) The drop edge of the next A pulse (11th) which passes though inverter I25 (after SCR3 has been turned off) is again inverted at I25G and fed through to turn on SCR5.

(2) The drop edge of the 11th A pulse is also fed directly to SCR4 to turn it off.

F. Turn on SCR1 with the drop edge of the 11th B pulse (start of 12th A pulse). At this point a pulse is developed to advance the scanner ring triggers.

(1) The on side input into SCR1 is controlled by a 3 way AND E20E, E20C and E20I. ANDed B pulses condition the emitter follower E20E. SCR1 in the off status, conditions emitter follower E20I with a plus input. SCR5 being on conditions emitter follower E20C. Five $\mu$ seconds after SCR5 is turned on, the B pulse at E20E goes to the negative level. This causes the output 112 from the AND to go the negative. The negative shift is inverted twice I19A and I19C to turn on SCR1.

(2) The negative shift from the E20 AND circuit also is fed through the scan control switch 114 in the normal position to inverters 125I and 125F. Inverter 125F's positive output is fed to the scanner ring triggers and the Home trigger at the right in FIG. 5*b*.

(3) The SCR has now been advanced through the first complete cycle (reset). The ring SCR advances in an identical manner, as outlined, until the end of scanning word 30 (30 SCR cycles later).

Figure 5B:
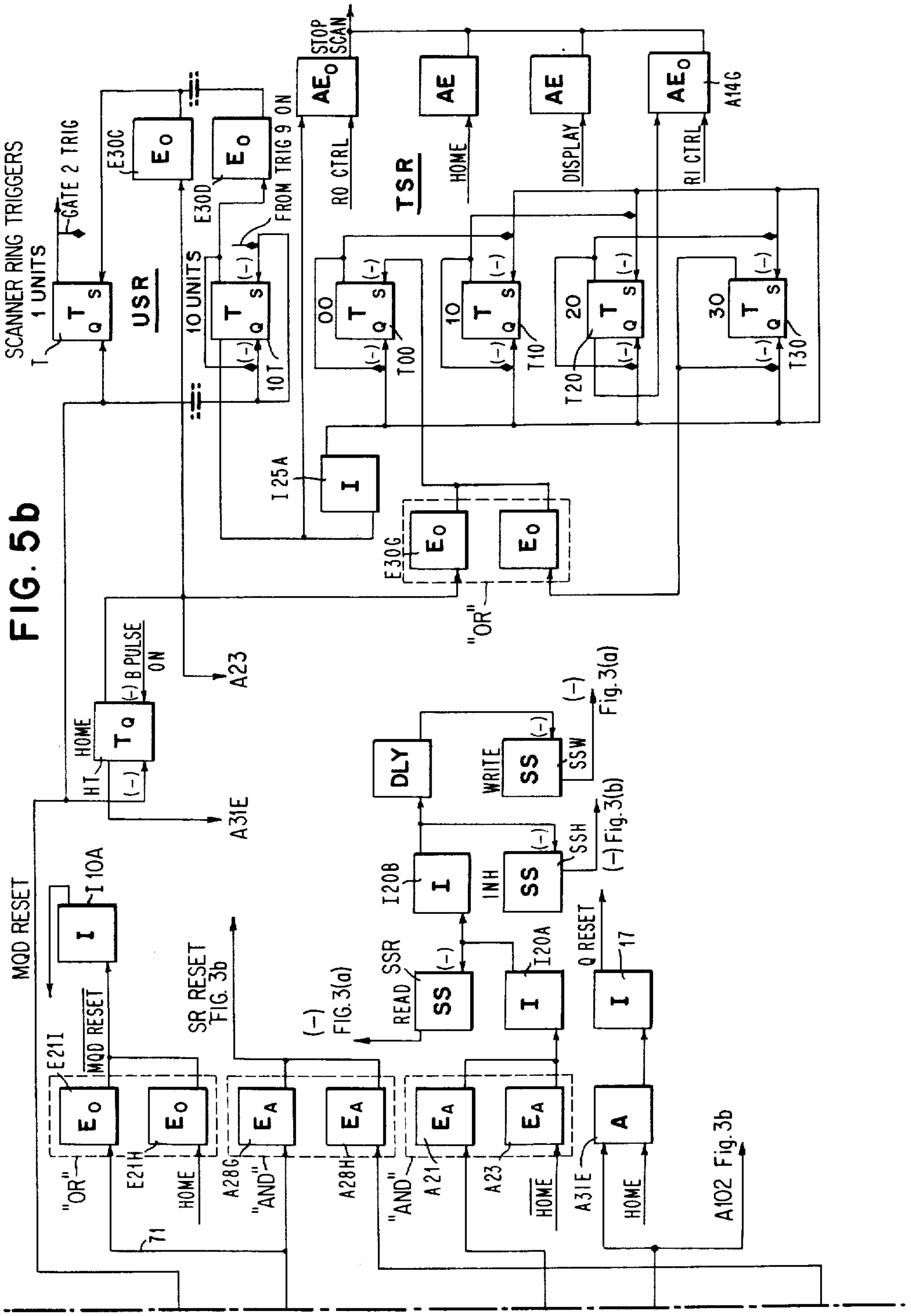

ADVANCING THE SCANNER RING TRIGGERS (FIG. 5*b*)

A. The scanner ring triggers are now all reset off and the negative shift from 125F has turned off the home trigger HT.

(1) The negative shift from the home trigger on side is fed through an emitter follower OR control E30C to turn on the units 1 scanner ring trigger T (FIG. 5*b*). The negative shift from the home trigger on side also feeds through another emitter follower E30G and turns on the tens ring "00" trigger T00.

Figure 3B:
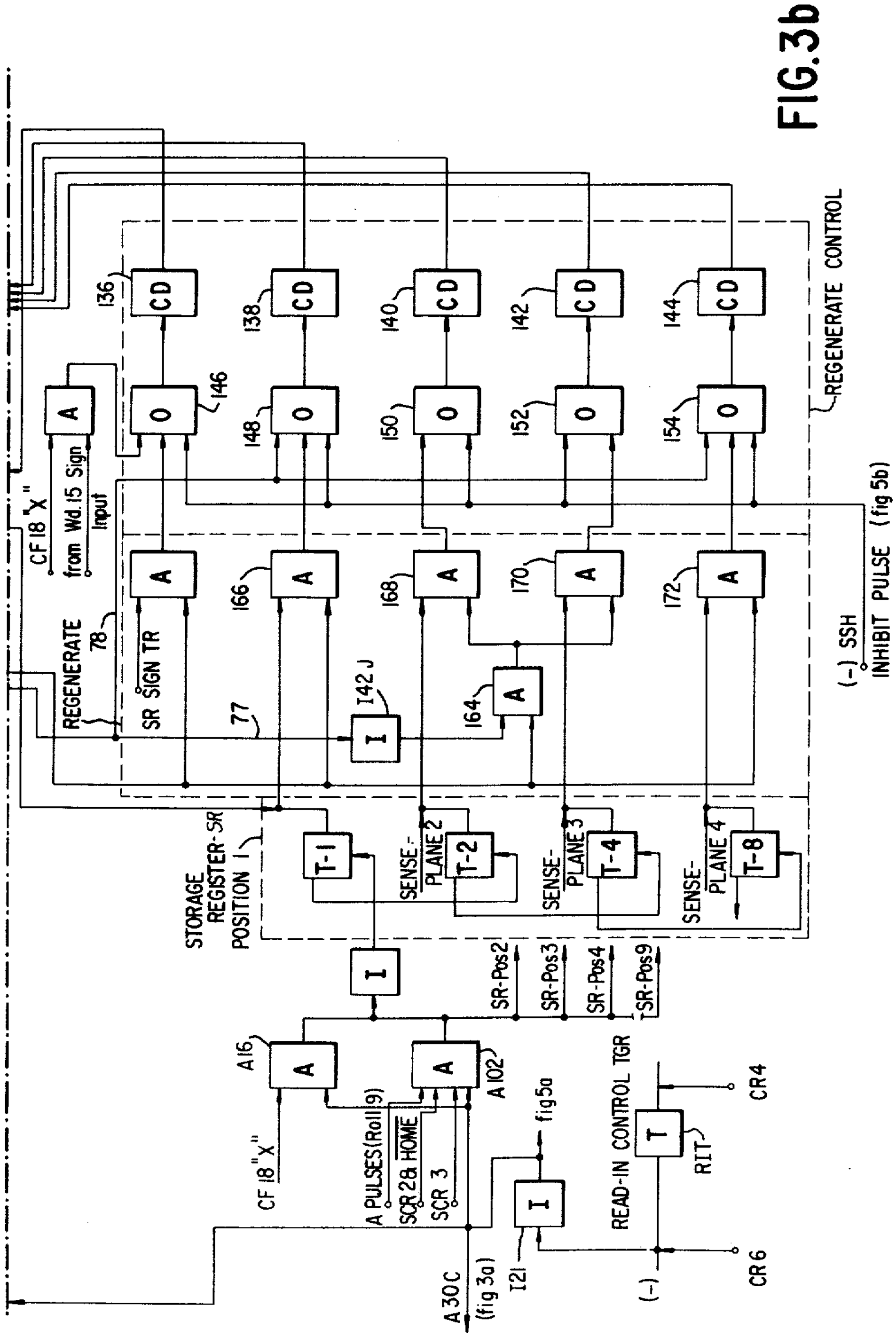

(2) The outputs from the "00" and 1 triggers are used to gate the read-write pulses (at SR in FIG. 3*a*) to the core drivers CDS. The core drivers each produce sufficient current to flip any cores in word one. At this point it should be noted that certain duplications exist between FIGS. 3*a* and 3*b*, and 5*a* and 5*b*. Specifically, the scanner ring triggers are duplicated in both FIGURES 5*b* (at right) and 3*a* (upper left) and the read in control trigger and its associated control circuitry, AND gates 102, 16 and 19, are duplicated in FIGURES 3*b* and 5*a*. This duplication exists merely for explanatory purposes and not in the actual circuitry. No outputs from the word scanner ring are shown in FIG. 5*b*. Read-in word 15 At X index line (FIGS. 3*a*, 3*b*). Since all of the scan word cycles are identical, read-in word 15 has been chosen as exemplary and the read-in circuitry will be described with relation thereto. It may now be considered that word fifteen is to be read out of the magnetic cores and regenerated back into the cores. (Assuming that word fifteen is plugged to read-in.)

A. At this point, units scanning ring (USR) trigger "5" is up and tens scanning ring trigger "10" is up. The output from the "5" trigger is fed to inverters I32A and I33A. The negative outputs from I32A and I33A partially condition OR circuits 122 and 124. (When negative impulses are applied to a positive OR gate, its action is identical to that of an AND gate in that it will produce a negative output only upon the coincidence of the negative inputs.)

B. The tens "10" trigger is ANDed A30C with read-in control trigger RIT (FIG. 3*b*) to provide an output to the scanner matrix.

C. At the scanner matrix, the units and tens trigger outputs (FIG. 3*a*) are combined. Two inputs coincide only once at each scanner matrix diode gate during each scanning interval (31 SCR cycles). However, an output is developed only when the word is plugged to read-in at plugboard 116. The scanner matrix is used to control two conditions. One, whether the card information is to enter into core memory M. Two, whether the word is to be read out into the storage register SR.

D. The scanner matrix output is fed through a ten way OR 017B which accommodates inputs 11–20 from the Scanner Matrix and out as the "10" input-output gate (two other ten way OR circuits, not shown, accommodate outputs 1–10 and 21–30).

E. The "10" input-output gate is fed into inverters I41G and I38G. The negative output from the inverters, partially conditions OR gates 130 and 128 so that when the negative read and write pulses are generated, core drivers 132 and 134 will be impulsed.

F. At this point the SCR (FIG. 5*a*) is still at 1 and 5 on. The outputs from these two triggers are ANDed A28G and A28H (FIG. 5*b*) to develop a storage register SR reset pulse which resets "off" the respective storage register SR trigger positions (FIG. 3*b*).

G. The SCR1 off side negative shift (lines 70 and 71, FIG. 5*b*) developes an MQD counter reset through an emitter follower OR E21I and E21H circuit. Until SCR1 was turned on, all inputs to inverter I10A were positive which resulted in negative outputs which will not reset the MQD triggers.

The negative MQD reset pulse is inverted I10A to a plus pulse which resets the four triggers that comprise the MQD.

H. The 13th A pulse turns off SCR1 and turns on SCR2. The read pulse is developed which reads out the cores comprising word 1.

(1) SCR2 ANDs A21 with scanner ring home trigger A23 at the not home status.

(2) The ANDed SCR2 pulse is inverted I20A to a negative shift which develops a negative pulse from the read single shot SSR.

(3) (FIG. 3*b*). The negative read SSR pulse feeds into OR gate 122. The combined negative inputs SSR, and I32A cause OR gate 122 to impulse the units "5" read core driver 118. The core driver supplies half of the current required to read out the word fifteen cores.

(4) The negative read SSR pulse also feeds into the OR gate 130 which is gated by the inverter I41G to impulse the "10" read core driver 132 with a negative pulse. The core driver supplies half of the current required to read out the word fifteen cores. The combined units and tens core driver currents read out any cores in word 15 that are in the "1" status.

(5) At the X line of card index, all core outputs are blocked out by not gating the sense amplifiers SA (FIG. 3*a*).

During the entire scan of X index line, AND gate A15 is supplied with two inputs, one from the read-in control trigger and one from level CF18. A15's output is inverted 140 and prevents the now positive SSR pulse (inverted at I20C) from gating AND gate A16. Thus, the gated sense amplifiers (38—one for each plane of memory) are prevented from passing the read-out core impulses.

I. The 13th B pulse adds one in the MQD counter (FIG. 5*a*). The pulse is inverted I10D to a negative shift which turns on the first MQD trigger. This is the first B pulse following the MQD reset at SCR2 on. B pulses continue to add into the MQD in the manner above noted.

J. The 14th A pulse turns on SCR3. The SCR3 output feeds into a four way AND A102 (FIG. 3*b*).

(1) The four inputs (A pulses, SCR2 and not home, SCR3, and read-in control trigger RIT) are now positive. At this time at other index lines except X, e.g., 0–9, there are provided 9 A pulses, which add into each storage register position SR. This is the invariable entry of "9" which provides the main part of the novel "readin" control.

(2) At the X line, CF18 voltage is ANDed at A16 with the read-in control trigger plus voltage. The output holds up the common output line between E16 and E17. The A pulses to the storage register SR are thus blocked out at the X line of index which is not a digit 0–9 index line.

K. An SCR advance delay occurs until a total of 10 B pulses are added into the MQD. This is necessary to advance the MQD counter beyond 9. As the MQD8 trigger goes off, the negative output is fed to SCR2.

L. The SCR2 trigger is turned off with the negative output from MQD8 stage. SCR2 off side plus output, turns on SCR4 and turns off SCR3. At this point the core inhibit and write pulses are developed due to the negative shift on SCR2's on side output 110. SCR4 output is not used for "read-in" purposes.

(1) The negative shift at emitter follower A21 is inverted twice (I20A and I20B). The negative shift immediately inpulses the four microsecond inhibit single shot SSH. Also the negative shift impulses the write single shot SSW after a slight delay to produce a short pulse.

(2) The developed write pulse is gated by the units scanning ring "5" trigger and the 10's scanning ring "10" trigger (acts through the scanner matrix DG), (see top of FIG. 3*a*) in a similar manner that was described for the read pulse. The units "write" core driver 120 and ten's "write" core driver 134 provide the full current necessary to flip all word "1" cores in the case of an initial word writing.

M. As previously stated, the inhibit pulse (bottom FIG. 3*b*) precedes and overlaps the write pulse. The inhibit pulse is controlled to impllse core drivers 136–144 (at right of FIG. 3*b*) and prevent the combined write core pulse currents from flipping certain cores to the "1" status. Because no core outputs were amplified no storage register triggers SR are on.

(1) Each core driver 136–144 is controlled to operate wiith a negative pulse controlled through either a two or three way OR circuit. Because the core driver operation requires a negative pulse any controlling OR circuit that developes a positive output prevents the respective core driver from operating.

(2) The negative inhibit pulse SSH feeds into the controlling OR circuits 146–154 in the core driver inputs for every position.

(3) Negative inputs to the core drivers are developed because the brush and storage register inputs are negative, producing negative outputs. As a result of these conditions the inhibit core drivers prevent each bit position of word one from flipping to the "1" status when the write pulse currents are operating.

N. The 23rd A pulse down shift turns off SCR4 and turns on SCR5 (FIG. 5*a*).

O. The 24th A pulse turns on SCR1.

(1) At this point the storage register SR and MQD counter are reset as previously outlined.

(2) The negative ouput shift from AND E20C etc., is inverted I25I to a plus shift.

(3) Items 1 and 2 occur at this point in each following SCR cycle until scanning is completed.

P. The scan advance pulse from the SCR is inverted at I25F to a negative pulse. The negative pulse turns on the units 6 trigger (not shown) through which is conditioned by the units 5 trigger T on side. The units 5 trigger T is also turned off with this negative pulse.

(1) Each scan advance pulse from the SCR is inverted at I25F to advance the units trigger ring. The units trigger that is on gates the advance pulse to the next higher trigger. Also the trigger that is on gates the advance pulse to turn off the gating trigger.

(2) The advance pulse that occurs (5SCR cycles later) when the units 10 trigger 10T is on, turns off the units 10 trigger. The negative shift from the on side feeds through an emitter follower E30D which turns on the units one trigger T. The positive shift at the off side is fed through and inverted at 125A to turn off the "10" tens trigger T10 and turn on the "20" trigger T20 as gated from the "10" trigger on side.

(3) The units and tens ring trigger outputs (FIG. 3*a*) gate the read-write pulses on each SCR cycle. This causes a word (1–30) to read out and regenerate on each SCR cycle. A total of 30 SCR cycles are used to scan words one through 30. Each following cycle operates in a manner like the one outlined for word one.

STOP THE SCANNER CONTROL RING (SCR)

A. At the point where word 30 is scanned, the units and tens scanner ring triggers have advanced to where the units 10T and the tens T20 triggers are on (FIG. 5*b*).

B. The next scan advance pulse turns off the units trigger 10T and the positive off side pulse is inverted at I25A which turns off the tens T20 trigger.

C. The plus off side shift of T20 is ANDED A14G with read-in trigger on voltage to develop a stop scan pulse.

D. The stop scan pulse ANDS A13E (FIG. 5*a*) with the scan ring control switch which develops a plus output from inverter E26E.

E. The output from the AND A13E turns off the B pulse control trigger BT. The negative on side output 106 turns on the scanner ring home trigger HT (FIG. 5*b*).

F. The B pulse control trigger plus off side output ANDS E25F with the next B pulse E25C and feeds through to turn off the A pulse control trigger AT. Turning off the A pulse control trigger AT removes the gating voltage required for A and B pulses to drive the SCR at A25 and A20 respectively. The SCR stops with SCR1 on.

G. The read-in control trigger RIT is turned off by the CR6 pulse which causes collector pull-over.

READ-IN AT ZERO CARD INDEX LINE

The circuit operation at this index line, forces 9's to enter all digit word positions that are wired to read-in. This operation is done during word regeneration from the storage register SR to cores. Although 9 A pulses are rolled into each storage register position during word scanning, they are needed at that point for read-out purposes and not for read-in. The regeneration of 9's insures that all words start with 9's in cores.

*Objective*

(1) Describe circuits that cause the read-in operation to start at the zero index line.

(2) Describe the regeneration control circuits which forces 9's to enter the cores.

START READ-IN OPERATION AT ZERO INDEX LINE SPECIFIC OPERATION (FIGS. 3*a* and 3*b*)

A. Turn on the read-in control trigger RIT (FIG. 3*b*).

(1) The CR4 read-in start impulse is provided and turns on the read-in control trigger RIT by collector pull-over.

B. The B pulse, A pulse, and ANDED A pulse control trigger, A and B pulses are provided to drive the SCR (FIG. 5*a*). (This was described in detail at the X index line.)

C. Assume that the SCR has advanced the scanner ring triggers to the point where the units 5 trigger and the tens "10" trigger T10 are on. (This is the word "15" example shown in FIG. 3*a*.)

DESCRIBE THE REGENERATION CONTROL CIRCUITS WHICH FORCES 9's TO ENTER CORES

A. When SCR2 is turned on, word "15" cores are read out (assumption made in step C, above).

B. Core outputs are amplified because the sense amplifiers SA are gated.

(1) The negative read single shot pulse SSA is inverted I20C to provide one input to sense amplifier controlling AND A16 circuits.

(2) Normally only the sign core could contain information at this core read out time. The sign core and any other core outputs are amplified and entered into the storage register SR.

C. A gate is developed that lasts for the entire zero line scanning operation and allows only the "2" and "4" input lines to the memory M from storage register SR to pass the inhibit pulse while simultaneously blocking the "1" and "8" lines.

(1) A+ AND gate A19, voltage level CF17 is applied for the entire 0 card index line. The read-in control trigger RIT plus "1" side voltage is also applied to AND A19. AND gate A19 thus provides a plus level which is fed to the brush input OR gate 158, 160, 162, . . . . Each OR gate provides an input to one position of the storage register and is equivalent to one digit position of word storage (only 3 of the 9 OR gates are shown in FIG. 3*b*).

D. The brush inputs (1–9) 77 and 78 (FIG. 3*b*) control the inhibit core drivers for each of the 9 positions that regenerate into the cores.

(1) The plus 1st brush input provides a plus input to OR gate 148. The plus input prevents the negative inhibit pulse from impulsing the related 1 bit core driver 138. Because of the foregoing action, the "1" bit core in the first digit of the fifteenth word is flipped to the "1" status by the combined write pulse currents.

(2) The plus 1st brush input also blocks the inhibit circuit to the 8 bit core driver 144 in a similar manner.

(3) The plus 1st brush input line 77 is inverted at 142J to a negative shift. The negative shift is present at the AND gate 164 and prevents the B pulse control trigger plus level from partially conditioning AND gates 168 and 170 when the inhibit pulse is generated. The negative input into the AND circuits 168, 170 prevents either the storage register 2 bit or 4 bit on triggers from blocking the inhibit pulse. A negative output is forced from each which allows the 2 and 4 bit inhibit core drivers 140 and 142 to operate. The 2 and 4 core bits remain at the "0" status and the "1" and "8" bits are flipped to the "1" status. This operation is done at this point in all 9 positions regenerating into cores. All words wired to read-in, when scanned at the zero index line, go through this outlined operation in all 9 positions.

E. The end of scanning word 30, turns off the B pulse and A pulse triggers as outlined at the X index line. The read-in trigger RIT is turned off by CR6.

READ IN AT CARD INDEX LINES 1 THROUGH 9

*General Operation*

The circuits required to recognize decimal digit holes read in the card R are to be considered. The input scanner or diode AND gate mixes an output from the scanner matrix with a conditioning voltage created by a hole read in the card providing an output upon a coincidence thereof. There are 11 diode AND gates for each word—one for each of the nine positions and including two sign entries.

The diode AND gate input from the scanner matrix establishes that a certain word is wired to read-in, and that the word select scanner rings are advanced to the correct point. The diode AND gate output provides a brush input pulse to the regeneration control circuits. Where several diodes are conditioned by brush readings, in corresponding positions of several words, the diode outputs to the OR circuits 162, 160, 158, . . . are sequenced by the scanner matrix outputs.

At index lines 1 through 9, holes read from the card control the regeneration circuits for the respective word position. At index line "1," as words read out into the storage register SR, each position contains the quantity of 9. Nine A pulses are added to the amounts contained in each position. This results in all positions standing at 8 before regeneration. The 8 in each position is normally regenerated into cores. However, a 9 is regenerated in any position where a brush is reading a card hole. The 8 is blocked out and a 9 is forced in the regeneration circuits. At following index lines, nine A pulses are added to each storage register position. The sum in each position is then regenerated. This operation repeats at index lines 2 through 9. Each time a hole is sensed, a 9 is regenerated in the corresponding word position.

*Objective*

(1) Describe circuits that roll nine A pulses into each storage register position.

(2) Describe circuits that control regeneration of a "9" into the cores of the memory M.

(3) Assume operation at the "1" index line. Describe circuits that roll nine A pulses into each storage register position.

*Specific Operation*

A. At the "one" index line, the read-in control trigger RIT (FIG. 3*b*) is turned on by CR4. The B pulse, A pulse and ANDed A and B pulse circuits are set up (FIG. 5*a*) previously explained.

B. Assume that the scanning operation has advanced to word 15.

(1) At the starting point (SCR1 and 5) the MQD counter and storage register SR are reset. At the same time, the units scanner ring is advanced (to 5).

(2) The next A pulse turns off SCR1 and turns on SCR2. The core read pulse SSR is developed which is gated by the units and tens ring outputs. The cores are read out of memory M and into the storage register SR.

(3) The next B pulse (B pulses and A pulse control trigger) feeds through inverter 110D and turns on the "1" trigger of the MQD counter.

(4) The next A pulse turns on SCR3.

C. A pulses roll into storage register SR.

(1) At AND gate A102 (FIG. 3*b*) A pulses, SCR2 and not Home, SCR3, and the read-in control trigger RIT combine to produce an output which is inverted and applied to the storage register T–1 trigger (SR position 1). This same input is applied to all 9 storage register positions.

D. A pulses add into the storage register positions until SCR2 and 3 are turned off by an ouput from the MQD counter 8 stage trigger. This occurs immediately after the 9th A pulse is added into the storage register positions.

E. Each B pulse (FIG. 5*a*) adds into the MQD counter. Because a B pulse is added into the MQD before the first A pulse enters the storage register, the MQD advances from 9 to 0 when the storage register positions have added 9 A pulses. The negative output from MQD8 stage feeds through to turn off SCR2.

F. The plus shift at SCR2 off side turns on SCR4 and turns off SCR3. At this point, the AND gate A102 (FIG. 3*b*) is no longer conditioned for A pulses to enter the storage register. The inhibit and write pulses are also generated. Assume now that the 8 trigger in the storage register SR is "on" (9 plus 9). AND gate 172 will produce an up level and apply it to OR gate 154. This will effectively block the negative inhibit pulse SSH from impulsing core driver 144. In all other SR regenerate channels, e.g., 1, 2, and 4, the inhibit pulse will cause the respective CD's to generate inhibit pulses. In effect, therefore, only the "8" bit of the BCD word will be written into by the coincident write pulses.

It is now proposed to describe circuits which control regeneration to enter a 9 into the cores for a brush input condition.

A. Assume position one is reading a hole in the card.

(1) The brush input from the card reader 2 (FIG. 3*a*) conditions diode AND gate 164 for the units position of word 15.

(2) The scanner matrix output DG gates the brush input.

(3) The plus diode AND gate output 164 feeds through OR gate 162 and leads 77 and 78 as a 1st brush input.

(4) The 1st brush input develops plus inputs to OR circuits 148 and 154. The plus inputs block the negative inhibit pulse from impulsing the 1 and 8 core drivers 138 and 144. The write pulse currents flip 1 and 8 cores to the "1" status. The 1st brush input is inverted over line 77 at inverter 142J to a negative shift, which prevents storage register outputs from blocking the negative inhibit pulse. The inhibit pulse impulses the core drivers 140 and 142 for bits 2 and 4. The write currents on bits 2 and 4 do not flip these cores to the "1" status.

B. Regeneration is now completed, and memory M positions 2 through 8 contain 8's in the cores. Position 1 contains a 9. Assuming no additional holes are read from the card, 9 pulses add at each index line to all digit positions of word 15. At card index line 9, after the 9 pulses are added, the storage register (and memory M) has a zero in positions 2 through 8, and a 1 in the units position. Other words operate in a similar manner.

C. At the completion of scanning word 30, the scanner operation is stopped. The read-in control trigger RIT is turned off by CR6 after the last card index line, FIG. 6.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the followng claims.

What is claimed is:

1. In a memory device, a matrix of bistable storage elements, a storage register wherein calculations are effected by successive entries of "9" for as many as ten entries of "9" per denomination for each single data storage operation to arrive at successive digits, one of which is to be stored, means for controlling selective entry of a digit, and means for cyclically entering and reentering said digits from said storage register to said bistable elements to be represented therein in binary coded form.

2. In a device for reading data inscribed in a perforated record card, means for sensing a plurality of parallel colmuns of data in a plurality of rows of sequentially fed record cards, a plurality of core memory devices each adapted to magnetically manifest one or the other of two items of binary information, said plurality of core devices comprising a memory means, timing scanners and pulse generators, a storage register of triggerable elements driven by said pulse generator, means operable by each sequentially fed record for rendering said storage register responsive to pulses produced by said generator, means synchronous with the movement of each of said sequentially fed record cards for entering in said storage register 9 pulses for each sensed card perforation and 9 pulses thereafter for each successive row of card data means responsive to each row of card data when stored in said storage register and to a signal generated by said scanners for initiating serial storage in said memory devices of each row of data on the passage of each card row, whereby said storage register is advanced by the successive entry of "9" a number of times determined by the location of the card perforation, said location determining 10—X entries of "9" to arrive at a final register standing of the card digit which is entered into binary core storage.

3. In a device for reading data inscribed in a perforated record card, means for sensing a plurality of parallel columns of data in a plurality of rows of sequentially fed record cards, a plurality of core memory devices each adapted to magnetically manifest one or the other of two items of binary information, said plurality of core devices comprising a memory means, timing commutators and pulse generators, a storage register of triggerable elements driven by said pulse generator, means operable by each sequentially fed record for rendering said storage register responsive to pulses produced by said generator, means synchronous with the movement of each of said sequentially fed record cards for entering in said storage register 9 for each sensed perforation and 9 thereafter for each successive row of data, means responsive to each row of card data when stored in said storage register and to a signal generated by said commutator for initiating the serial storage in said memory means of each row of data on the passage of each card row, whereby said storage register is stepped around by the successive entry of "9" a number of times determined by the location of the card perforation said location determinating 10—X entries of "9" to arrive at a final register standing of the card digit which is entered into binary core storage.

4. In a device for reading data on a record, means for sensing said record data in parallel, a plurality of bistable memory devices each adapted to manifest one or the other of two states of binary information, timing scanners and pulse generators, a storage register of triggerable elements driven by said pulse generator, means under control of said record sensing means for rendering said storage register responsive to pulses produced by said generator, means operated synchronously with the movement of said record for entering in said storage register 9 pulses for each item of sensed data and 9 pulses thereafter for each possible entry position of a data item, means responsive to each record item data when stored in said storage register and to a signal generated by said scanners for initiating the repetitive storage in said memory devices of each item of record data, whereby said storage register is advanced by the successive entry of "9" a number of times determined by the location of the record item, said location determining a differential number of entries of "9" to arrive at a final register standing of the record item of data which is entered into said binary memory devices.

5. A digit registering device comprising four stages of binary bit representing elements, a first means for pulsing the "1" bit element with a series of pulses representative of a digit, and a second means for separately pulsing one or more of said bit elements simultaneously with single pulses to represent a digit, whereby said device may be controlled by a decimal source by said first means and a binary storage source through said second means.

6. A device as set forth in claim 5 wherein said first means is controlled by a decimally coded record, and said second means is controlled by reading four bit binary core memory elements coinciding with the four stages of the registering device.

7. In a system for cyclically translating data into a memory from a data source having separate ordinal decimal positions, the combination comprising; counter means; entry means for inserting the contents of said memory into said counter means; pulse generating means for impulsing said counter means with 9 pulses after an operation of said entry means so as to cause said counter means to add 9 to the previously inserted contents from said memory; data regeneration means connected between said counter means and said memory for (1) initially forcing 9's into said memory before said data translation begins, (2) responding to no input from said data source by allowing the data in said counter means to enter said memory, and (3) responding to an input from said data source to block the data in said counter means from entering said memory and, to instead, force a 9 into said memory and timing means for repetitively operating said entry means and said data regeneration means until all ordinal data from said data source has been entered into said memory.

References Cited in the file of this patent

UNITED STATES PATENTS

| | | |
|---|---|---|
| 2,750,113 | Coleman | June 12, 1956 |
| 2,864,557 | Hobbs | Dec. 16, 1958 |

FOREIGN PATENTS

| | | |
|---|---|---|
| 709,408 | Great Britain | May 26, 1954 |